United States Patent [19]

Davidson et al.

[11] Patent Number: 4,503,946

[45] Date of Patent: Mar. 12, 1985

[54] BRAKING PISTON FOR A DISC BRAKE

[75] Inventors: Donald J. Davidson, Troy; David D. Sheill, Farmington Hills, both of Mich.

[73] Assignee: Rockwell International Corporation, Pittsburgh, Pa.

[21] Appl. No.: 528,300

[22] Filed: Aug. 31, 1983

[51] Int. Cl.³ .............................................. F16D 55/02
[52] U.S. Cl. .................................. 188/71.9; 188/72.8; 188/196 D; 188/72.6
[58] Field of Search ................... 29/450, 434, 156.5 R; 188/71.9, 72.8, 196 D, 72.4, 72.6, 79.5 K; 74/18.2

[56] References Cited

U.S. PATENT DOCUMENTS

| | | | |
|---|---|---|---|
| 3,465,855 | 9/1969 | Kramer | 188/196 D |
| 3,767,016 | 10/1973 | Hurt | 188/196 D X |
| 3,788,430 | 1/1974 | Hurt | 188/72.8 X |
| 3,949,840 | 4/1976 | Cumming et al. | 188/79.5 K |
| 4,022,300 | 5/1977 | Afanador et al. | 188/79.5 K X |
| 4,392,557 | 7/1983 | Franke | 188/71.9 |
| 4,454,933 | 6/1984 | Hunnicutt et al. | 188/71.9 |

Primary Examiner—Charlie T. Moon

[57] ABSTRACT

An improved braking piston for a disc brake is of the type which includes a disc mounted for rotation about an axle and a brake housing mounted on the axle in alignment with a friction surface of the disc. The braking piston has an interior end at least partially mounted within the housing and an external end outwardly of the housing adjacent the friction surface of the disc. A powershaft is mounted within the housing in coaxial alignment with the braking piston and is capable of selective rotation by an air disc brake actuator mounted on the housing. The powershaft has worm gear teeth engaged with mating teeth on the interior end of the braking piston. The improvement includes providing the braking piston with a plurality of axially extending splines about an exterior surface of the interior end to mate with corresponding splines on an interior surface of the housing to limit rotation of the braking piston relative to the housing while allowing axial movement thereof directly corresponding to the selective rotation of the powershaft.

3 Claims, 5 Drawing Figures

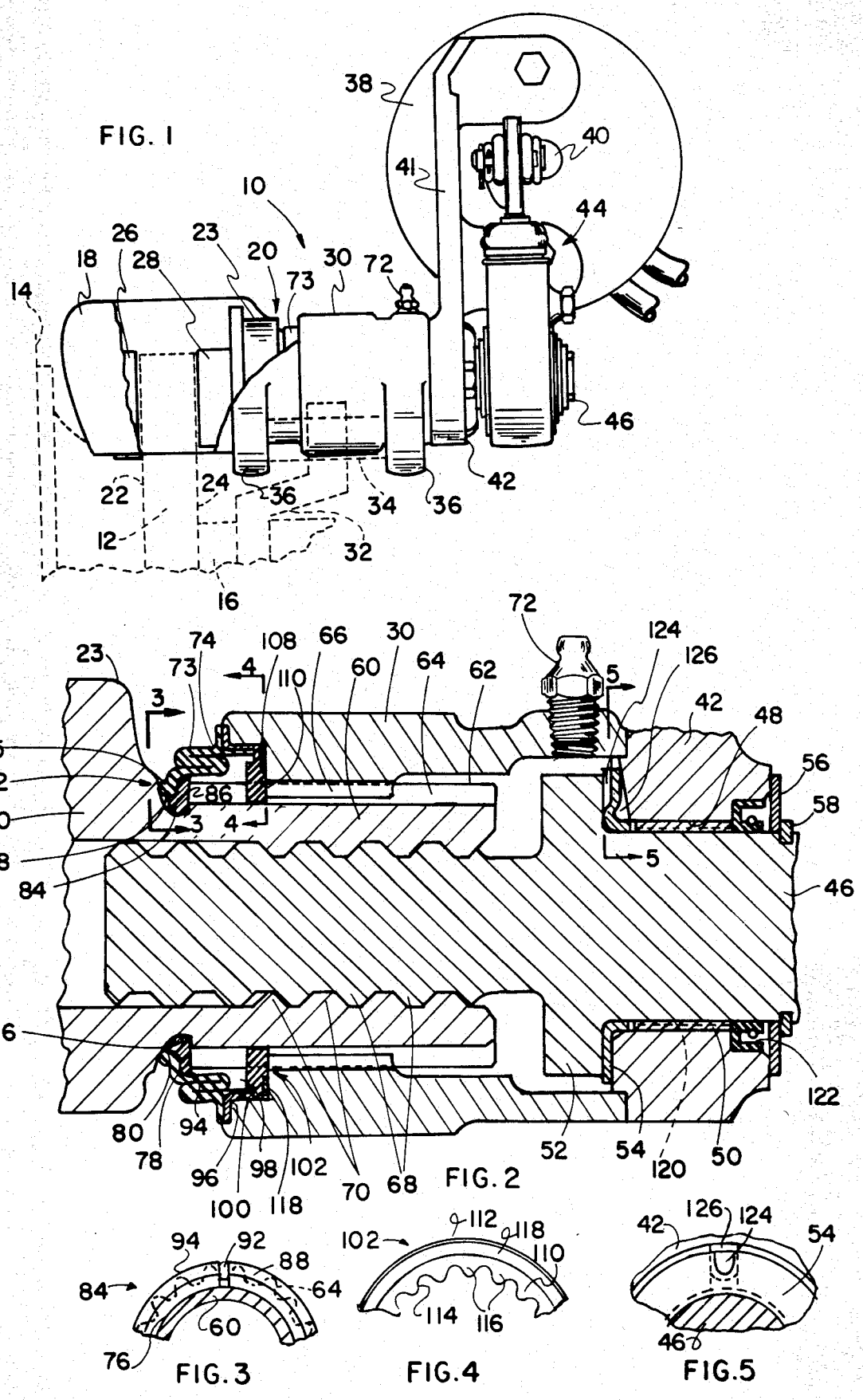

BRAKING PISTON FOR A DISC BRAKE

BACKGROUND OF THE INVENTION

1. Field of Invention

This invention relates to an improved braking piston for a disc brake and, more specifically, to such a braking piston which is provided a plurality of axially extending splines to mate with a plurality of axially extending splines within an interior of a brake housing thereof.

2. Description of the Prior Art

One type of disc brake which is well known in the automotive field utilizes a rotating disc or rotor which is mounted for rotation with a wheel. The brake includes a caliper assembly which is mounted on the axle with an extended, outboard portion which overlies the outboard side of the disc and a piston which is aligned with the inboard side of the disc. Axial movement of the piston causes the disc to be entrapped therebetween to produce a frictional force thereon intending to prevent rotation of the disc and wheel.

Two such disc brakes are disclosed in U.S. Ser. No. 484,025, filed on Apr. 11, 1983, now U.S. Pat. No. 4,478,316, issued Oct. 23, 1984 by Donald J. Davidson and entitled "Slack Adjustor for a Disc Brake" and U.S. Ser. No. 484,026, filed on Apr. 11, 1983, now U.S. Pat. No. 4,478,317, issued Oct. 23, 1984 by David D. Sheill and entitled "Slack Adjustor for a Disc Brake". These brakes utilize a non-rotatable braking piston which is mounted in a housing of the brake for axial movement toward and away from the friction surface of the disc. Brake actuation means is mounted on the housing. A powershaft is mounted within the housing, is coaxially aligned with the piston and is capable of selective rotation by the brake actuation means. The powershaft has worm gear teeth thereon engaged with a powershaft nut within the housing which powershaft nut is prevented from rotating and is capable of axial movement directly corresponding to the selective rotation of the powershaft. The powershaft nut is operably connected to the piston to produce the axial movement thereof toward and away from the friction surface of the disc.

While these two prior art brakes utilize slack adjusters which are within the interior of the housing, the utilization of such a powershaft nut has been found to add to the overall length of the brake. Accordingly, even though there are other similar brakes which utilize slack adjusters external of the housing, there remains a need for providing such a brake which has a minimum overall length while eliminating as many elements as possible which would tend to unnecessarily add to the overall length of the housing of the brake. Nevertheless, any attempt to alter such a brake should include reliable means for preventing the entrance of undesired contaminants into the interior of the housing, means for insuring that lubricant will be properly retained within the housing, and any other features which will insure that the brake will be capable of effectively operating throughout the expected life thereof.

SUMMARY OF THE INVENTION

It is an object of this invention to provide a braking piston for a disc brake which is effective, reliable and relatively simple to maintain.

These and other objects of the invention are provided in a preferred embodiment thereof including an improved braking piston for a disc brake of the type which includes a disc mounted for rotation about an axle. A brake housing is mounted on the axle in alignment with a friction surface of the disc. The braking piston has an interior end at least partially mounted within the housing and an external end outwardly of the housing adjacent the friction surface of the disc. Brake actuation means is mounted on the housing. A powershaft is mounted within the housing in coaxial alignment with the braking piston and is capable of selective rotation by the brake actuation means. The powershaft includes worm gear teeth thereon engaged with mating teeth on the interior end of the braking piston. The improvement includes the braking piston having a plurality of axially extending splines about an exterior surface of the interior end to mate with corresponding splines on an interior surface of the housing to limit rotation of the braking piston relative to the housing. The splines allow axial movement of the braking piston toward and away from the friction surface of the disc with the axial movement thereof directly corresponding to the selective rotation of the powershaft.

BRIEF DESCRIPTION OF THE DRAWINGS

FIG. 1 is a fragmentary, elevational view, partially in section, of the preferred caliper brake assembly including various features of the invention.

FIG. 2 is a fragmentary, sectional view of the interior of the brake assembly shown in FIG. 1.

FIG. 3 is a view as seen along line 3—3 of FIG. 2.

FIG. 4 is a view of the preferred braking piston sealing element as generally seen along line 4—4 of FIG. 2.

FIG. 5 is a view as seen along line 5—5 of FIG. 2.

DETAILED DESCRIPTION OF THE PREFERRED EMBODIMENT

As seen in FIG. 1, a preferred caliper disc brake 10 utilizes a disc or rotor 12 which is rigidly mounted on a wheel 14 or the like. The wheel 14 is mounted for rotation about an axle 16 which could be a trailer axle or a drive axle for a truck or tractor. The caliper brake 10 includes an extended portion 18 and a non-rotating, axially movable braking piston 20 which are respectively aligned with an outboard friction surface 22 and an inboard friction surface 24 of the disc or rotor 12. Both the extended portion 18 and an external end 23 of the movable piston 20 respectively employ shoes and friction pads 26 and 28 to produce frictional contact with the opposite sides of the disc 12.

Although only the piston 20 is intended to move within a housing 30 of the caliper brake 10, the method used to produce movement of the piston 20 and to mount the brake 10 on the axle 16 insures that a braking force is applied to the opposite sides of the disc 12. Specifically, the housing 30 of the brake 10 is mounted on a torque plate 32 which is rigidly secured to the axle 16. The torque plate 32 supports a pair (only one shown in FIG. 1) of caliper slide pins 34 each of which is slidably supported at an intermediate portion thereof with its opposite ends extending axially therefrom. At each side of the the housing 30, a pair of axially spaced supports 36 are provided co-axially aligned holes therethrough for rigidly securing the opposite ends of the caliper slide pin 34 therein. Accordingly, the entire housing 30 of the brake 10 is capable of moving axially relative to the axle 16 and the disc 12.

To produce the axial movement of the brake piston 20, a preferred brake actuation means includes an air chamber 38 which has an actuation rod 40 extending therefrom. The air chamber 38 is rigidly mounted to the housing 30 by a bracket 41 integrally formed with a housing end closure 42 for movement with the housing 30. The actuation rod 40 is coupled to an actuation arm 44 so that inward and outward movement of the rod 40 will produce rotating movement of the arm 44. The actuation arm 44 is of the type which includes a slack adjusting mechanism and is generally disclosed in U.S. Pat. No. 3,949,840 which is entitled "Cam Brake Automatic Slack Adjusting Mechanism" and issued on Apr. 13, 1976. However, any number of actuating arms having similar slack adjusters could be alternatively employed. The actuation arm 44 is secured to a powershaft 46 and it will be seen that rotation of the powershaft 46 will produce corresponding axial movement of the piston 20.

Accordingly, as the brake 10 is being actuated, the actuation rod 40 will produce rotating movement of the actuation arm 44 and outward movement of the piston 20 until the friction pad 28 thereon is brought into contact with the inboard surface 24 of disc 12. If the friction pad 26 on the extended portion 18 is not in contact with the outboard surface 22 of the disc 12, continued movement of piston 20 will cause the entire housing 30 to be moved axially on the caliper slide pins 34 relative the torque plate 32 until both friction pads 26 and 28 apply a compressive force on the disc 12 to produce the desired braking friction at both sides thereof. Although exaggerated for the purposes of demonstration, a normal, predetermined running clearance is desired to insure that only minimal axial movement of the piston 20 is required to insure that there is full braking force being applied to the disc 12. Obviously, as the usable material of the friction pads 26 and 28 begins to wear away, there is a concern that the running clearance will be enlarged to a degree which will interfere with quick, reliable braking operation. Accordingly, the prior art slack adjusting means incorporated within the actuation arm 44 will operate to relocate the arm 44 relative to the powershaft 46 during the operational life of the brake 10.

As seen in FIG. 2, the powershaft 46 is mounted for rotation within the housing 30 and is coaxially aligned with the piston 20. With the actuation arm 44 splined to the powershaft 46, it is capable of being selectively rotated within the housing 30. Specifically, the powershaft 46 is mounted within a hole 48 in the housing end closure 42 at a bushing 50. The bushing 50 is preferably made of oil impregnated, powdered metal and is press fit into the hole 48. To prevent retraction of the powershaft 46 from the interior of the housing 30 during operation, a radially extending shoulder portion 52 is entrapped within the interior of the housing 30 against a thrust washer 54 which is supported by the housing end closure 42. Various details of the preferred thrust washer 54 will be discussed hereinbelow. Additionally, to prevent undesired insertion of the powershaft 46 into the interior of the housing 30, a washer element 56 encircles the exterior end of the powershaft 46 for contact against the exterior surface of the housing end closure 42 and is retained in position by a snap ring 58.

It will be seen that for proper operation of the preferred brake 10, it is desirable to mount the piston 20 for axial movement within the housing 30 in a manner which will insure against significant rotation thereof while allowing axial movement toward and away from the disc 12. Specifically, the piston 20 has an interior end 60 which is provided a plurality of axially extending splines 64 about an exterior surface 62 thereof. The splines 64 mate with corresponding splines 66 within an interior surface of the housing 30 to limit rotation of the piston 20 so that it will be capable of only axial movement when acted upon by the powershaft 46. To convert the rotational movement of the powershaft 46 to axial movement as required for applying the braking force to the piston 20, worm gear teeth 68 on the powershaft 46 engage with matching internal teeth 70 of the interior end 60 of the piston 20. Accordingly, the piston 20 will move axially in direct correpondence to selective rotation of the powershaft 46.

Although as described hereinabove, the preferred brake 10 will function properly to produce the desired frictional forces on the disc 12, there are a number of features of the basic design which require additional consideration to insure proper operation of the brake. Specifically, because of the large forces generated within a brake of this type, the various contacting surfaces between the elements as described hereinabove require proper lubrication in order to effectively operate throughout the life of the brake 10. Accordingly, a grease fitting 72 is provided to insure that grease or some other suitable lubricant can be periodically resupplied to the interior of the housing 30 throughout the life of the brake. Additionally, the piston 20 is designed to include an encircling, flexibe boot seal 73 with a first end 74 secured to the housing 30 and a second end 75 surrounding the interior end 60 of the piston 20 to insure that undesirable contaminants will not enter the interior of the housing 30 and interfere with the operation of the various elements therein.

Although at first glance it might appear that any spline design could be employed, there should be some consideration given to the type of splines 64, 66 provided to insure that there will be effective and reliable movement of the piston 20 throughout operation of the brake 10. Specifically, the splines 64, 66 are preferably provided major diameter fit rather than a fit between the side walls of the splines. The choice of a fit at the major diameter has been made in the preferred brake 10 to insure that the piston 20 will not wobble within the housing 30 although there would appear to be the possibility of some limited rotation of the piston 20 when acted upon by the powershaft 46. If the tolerances were to be critically maintained at the major diameter and the side walls, the resulting surface contact in both regions would unduly complicate installation of the internal end 60 of the piston 20 into the housing 30. Accordingly, it is expected that, once installed, the piston 20 will move in an axial direction with little or no deviation but with some limited rotation being possible and expected during braking operation.

It should be noted that the splines 64 are significantly longer than the splines 66. The splines 64 on the interior end 60 of the piston 20 are axially longer than the splines 66 to allow for the expected repositioning of the piston 20 which occurs during the life of the friction pads 26, 28 as the piston 20 is adjusted by the slack adjuster mentioned hereinabove. Accordingly, although there has heretofore been reference made to the interior end 60 of the piston 20, it should be understood that the interior end 60 will only partially be within the interior of the housing 30 and will extend further from within the housing 30 as the friction pads 26 and 28 become worn. However, since one objective of the preferred brake design is to limit the overall length of the brake 10, such extensive splines 64 have produced a problem in the manufacture of the piston 20. Clearly, if one were not concerned with the overall length of the brake 10, sufficient space could be provided at the terminal end of the splines 64 toward the disc 12 to insure sufficient axial space between the ends of the splines 64 and the second end 75 of the boot seal 73. However, in order to reduce the overall length of the piston 20, it is desirable to have the splines 62 extend as close as possible to the boot seal 73. As a result, it has been found that any attempt to provide the splines 64 through hobbing would add a non-usable portion to the terminal end of the splines 64 which would extend into the region where the boot seal 73 encircles the piston 20. To eliminate this problem, the preferred piston 20 is initially formed to include a circumferential groove 76 having a first radial wall 78 at the designed location of the terminal end of the splines 64 toward the disc 12 and a second radial wall 80 axially separated from the first radial wall 78. Providing such a circumferentail groove 76 allows the splines 64 to be formed by shaping since there is accordingly provided a circumferential region for metal relief as the shaping tool completes each path during formation of the splines 64. However, in order to provide a proper channel 82 for receipt of the second end 75 of the boot seal 73, a ring element 84 is mounted in the circumferential groove 76 and has a first side 86 which is against the first radial wall 78 and a second side 88 separated from the second radial wall 80 to define the circumferential channel 82 therebetween.

As seen in FIG. 3, the preferred ring element 84 is made of a hard, resilient plastic material and includes a radial slot 92 to allow its expansion over the splines 64 for axial movement therealong until it is installed within the circumferential groove 76. Additionally, the peripheral edge 94 is dimentioned to extend radially beyond the splines 64 to add further protection to the boot seal 73 during operation of the piston 20. It should be noted, of course, that the piston 20 will extend significantly to the left from the position as shown in FIG. 2 during the continued wear of the friction pad 26, 28 and extension of the boot seal 73 would increase the likelihood of damage thereto by the splines 64.

To complete the mounting of the boot seal 73 between the housing 30 and the piston 20, the first end 74 of the boot seal 73 is provided an embedded metal portion 96 which is press fitted within a cylindrical recess 98 of the housing 30 against an interior cylindrical wall 100 thereof. As thus mounted, the boot seal 73 will prevent the entrance of undesired contaminants into the interior of the housing 30.

However, as mentioned hereinabove, it is intended that the interior of the housing 30 will be provided a suitable lubricant to insure proper operation of the brake. As a result, there is concern that the periodic resupply of lubricant under pressure at the grease fitting 72 could cause the lubricant to apply significant pressure directly to the boot seal 73 to cause it to be disengaged or dislodged from either the piston 20 or the housing 30. Accordingly, the preferred brake 10 includes lubricant sealing means 102 which is intended to prevent the lubricant from escaping through the splines 64, 66 and to the boot seal 73.

To provide the preferred lubricant sealing means 102, the cylindrical recess 98 is provided a base including a radially extending annular surface 108. A sealing ring 110 is primarily made of a resiliently compressable material such as nitrile rubber and is installed within the cylindrical recess 98. The sealing ring 110, as seen in FIG. 4, has an outer peripheral edge 112 to make contact with the cylindrical wall 100 and an interior edge 114 including the plurality of teeth 116 which are compressed to be received and make sealing contact with the plurality of axially extending splines 64 of the exterior surface 62 of the interior end 60 of the braking piston 20. As shown in FIG. 4, the sealing ring 110 is in a non-compressed condition and the size of the teeth 116 are therefor larger than the corresponding dimensions of the spline 64 on which they are to be received.

To insure the sealing ring 110 will be retained within the cylindrical recess 98 throughout operation of the brake, the metal portion 96 of the boot seal 73 is installed, as mentioned hereinabove, to prevent retraction of the sealing ring 110. To add rigidity to the sealing ring 110, and to insure that the teeth 116 will remain in contact with the spline 64 throughout operation of the brake, the sealing ring 110 is provided a radially extending annular metal insert 118 at a side thereof against the annular surface 108 to add rigidity thereto and insure firm contact of the sealing ring 110 with the annular surface 108.

With the sealing ring 110 so installed, lubricant provided at the fitting 72 will be incapable of escaping from the interior of the housing 30 at the end thereof toward the disc 12. However, lubricant will be capable of escaping from the other end of the housing so that one adding lubricant will be able to determine when a sufficient quantity has been added to the interior of the housing 30. Specifically, the lubricant will be capable of passing by the thrust washer 54 and through a plurality of axial grooves 120 formed in the interior surface of the bushing 50. In the preferred brake 10, six such axial grooves 120 are provided. Escaping lubricant will then pass by the end seal 122 around the powershaft 46 and will eventually be visible at the washer element 56 retaining the powershaft 46 from insertion thereof into the housing 30.

As thus described, one might think that any type of thrust washer 54 would be adequate for accommodating the thrust forces created on the powershaft 46 at the radially extending shoulder portion 52. However, it has been found that a preferred thrust washer 54 would be made of steel but would be provided a form of polytetrafluoroethylene at the surface thereof adjacent the shoulder portion 52.

Although polytetrafluoroethylene has a low coefficient of friction at high contact pressures, it has been found at low contact pressure to exhibit a relatively high coefficient of friction. Therefore, when the brake is first being applied and only minor rotation exists between the powershaft 46 and the housing end closure 42, minor rotation of the thrust washer 54 relative to the end closure 42 could be expected. If the thrust washer 54 were allowed to rotate in this manner, undesirable and unacceptable wear of the steel at the surface thereof adjacent the end closure 42 would be expected. Accordingly, the preferred thrust washer 52 is provided an upset portion 124, as seen in FIG. 2 and FIG. 5, which is to be received within a radially extending recess 126 in the interior surface of the end closure 42. With the upset portion 124 positioned within the recess 126 in this manner, the thrust washer 54 will be prevented from any rotation which would produce excessive wearing of the steel and interfere with its effective operation throughout the use of the brake 10.

It should be clear to those skilled in the brake art that any number of alterations may be made to the preferred brake 10 while still falling within the scope of the invention as claimed.

I claim:

1. An improved braking piston and housing for a disc brake of the type which includes a disc mounted for rotation about an axle, said brake housing mounted on said axle in alignment with a friction surface of said disc, said housing having a piston receiving bore therein, said braking piston having an interior end at least partially mounted within said housing and an external end outwardly of said housing adjacent said friction surface of said disc, brake actuation means mounted on said housing, a power shaft mounted within said housing in coaxial alignment with said braking piston and capable of selective rotation by said brake actuation means, and said powershaft having worm gear teeth thereon engaged with mating teeth on said interior end of said braking piston, said improvement comprising:

said piston receiving bore having a plurality of axially extending splines;

said braking piston having a plurality of axially extending splines about an exterior surface of said interior end to mate with corresponding splines on an interior surface of said housing to limit rotation of said braking piston relative to said housing;

said piston further including a circumferential groove in said exterior surface of said braking piston, said circumferential groove having a first radial wall at a terminal end of said axially extending splines toward said disc and a second wall axially separated from said first wall, a ring element mounted in said circumferential groove having a first side against said first radial wall and a second side separated from said second radial wall of said circumferential groove to define a circumferential channel therebetween, and a flexible boot seal surrounding said interior end of said braking piston and having a first end sealingly secured to said housing and a second end extending into said channel for selaed contact therewith;

said splines allowing axial movement of said braking piston toward and away from said friction surface of said disc with said axial movement directly corresponding to said selective rotation of said powershaft.

2. The improved braking piston as set forth in claim 1, wherein said ring element is made of resilient plastic and includes a radial slot therein for expanded encirclement of said axially extending splines and axial movement therealong prior to installation within said circumferential groove.

3. The improved braking piston as set forth in claim 1, wherein said ring element includes a peripheral edge extending radially outwardly of said axially extending splines to prevent contact of said flexible boot seal at said second end thereof with said terminal end of said splines.

* * * * *